United States Patent [19]

Hutchinson et al.

[11] 4,187,269

[45] Feb. 5, 1980

[54] EXTRUSION PROCESS FOR REDUCING MELT FRACTURE

[75] Inventors: Loyd B. Hutchinson, Denham Springs; Robert R. Blanchard, Port Allen, both of La.

[73] Assignee: The Dow Chemical Company, Midland, Mich.

[21] Appl. No.: 857,499

[22] Filed: Dec. 5, 1977

Related U.S. Application Data

[62] Division of Ser. No. 632,539, Nov. 17, 1975, Pat. No. 4,080,138.

[51] Int. Cl.² ............................................... B29F 3/10
[52] U.S. Cl. ............................ 264/171; 264/176 R; 264/209
[58] Field of Search ........................... 264/171, 40.6; 425/378 R, 381, 467; 264/176 R, 209

[56] References Cited

U.S. PATENT DOCUMENTS

| | | | |
|---|---|---|---|
| 3,266,093 | 8/1966 | Corbett | 264/171 |
| 3,408,277 | 10/1968 | Martin et al. | 264/171 |
| 3,437,725 | 4/1969 | Pierce | 264/176 R |
| 3,536,802 | 10/1970 | Uraya et al. | 264/171 |
| 3,609,809 | 10/1971 | Slicker | 264/209 |
| 3,780,149 | 12/1973 | Keuchel et al. | 264/171 |
| 3,860,372 | 1/1975 | Newman | 425/133.1 |
| 3,904,730 | 9/1975 | Shimizu et al. | 264/171 |

FOREIGN PATENT DOCUMENTS

1434801  12/1966  France ...................................... 264/168

*Primary Examiner*—Jay H. Woo
*Attorney, Agent, or Firm*—A. J. Young

[57] ABSTRACT

Process and apparatus for extruding synthetic resinous thermoplastic materials, wherein a heat plastified stream of such material is divided into a primary or core stream, and non-primary or secondary stream(s), the secondary stream(s) heated to a temperature substantially hotter than the core stream, and the hot secondary stream(s) thereafter layered onto the opposite surfaces of the core stream prior to expelling the material from an extrusion die. Such a process and apparatus is practiced to avoid a loss of surface smoothness in the extruded product.

8 Claims, 1 Drawing Figure

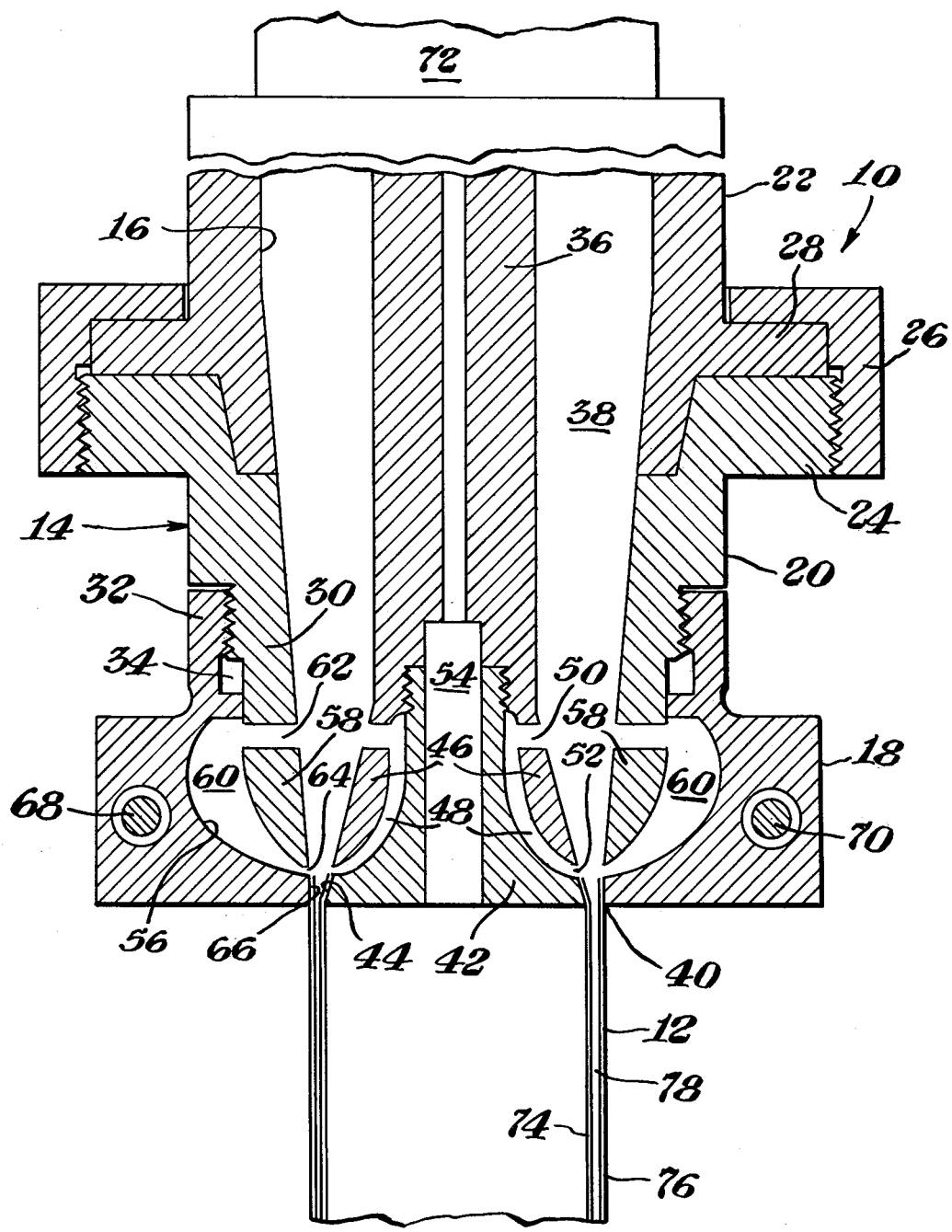

EXTRUSION PROCESS FOR REDUCING MELT FRACTURE

CROSS-REFERENCE TO RELATED APPLICATION

This is a division of application Ser. No. 632,539 filed Nov. 17, 1975, now U.S. Pat. No. 4,080,138.

FIELD OF THE INVENTION

The invention is in the field generally of apparatus and methods for processing synthetic resinous thermoplastics by flowing the material in a molten state through an extrusion die. The invention more specifically relates to improved extrusion apparatus and methods which beneficially minimize the tendency of extruded thermoplastics to melt fracture or lose surface smoothness.

BACKGROUND OF THE INVENTION

Significant diminishment of surface smoothness in articles prepared by extrusion of thermoplastic resins is generally referred to as "melt fracture".

The tendency of resins to melt fracture has been the subject of considerable past research efforts. Prior conventional approaches to this problem typically involve modifications to the resin in order to reduce the sensitivity of the material to melt fracture. Resin modifications, such as broadening the molecular weight distribution, however, tend to reduce the physical properties of the resin below that which can be obtained from the unmodified resin.

Accordingly, it is an object of this invention to provide improved processes and apparatus for extruding synthetic resinous thermoplastic materials under conditions permitting a broader latitude in the selection of resin with regard to the problem of melt fracture, i.e., processes and apparatus which operate in a manner to reduce the sensitivity of various resins to melt fracture.

It is a further objective of this invention to provide such processes and apparatus which beneficially allow the rate of extrusion to be increased while maintaining or improving the smoothness of the surface finish of the extruded product.

Yet additional objects and advantages of the present invention are made even more apparent in and by the ensuing description and specification taken in conjunction with the accompanying drawing showing apparatus, in partial cross-section, constructed according to the principles of this invention.

DETAILED DESCRIPTION OF THE INVENTION

The die 10 illustrated in the drawing and described more specifically herein is designed to extrude a tubular shaped article or product 12. The invention in its broadest sense, however, is not intended to be limited to the cross-section desired of the product 12. For example, the inventive principles may be readily transported and used in dies designed to extrude flat products such as sheet or film, hollow articles of non-tubular shape, or non-hollow, non-flat articles such as moldings and the like. Accordingly, the present teachings have utility in the field generally of manufacturing both intermediate and finished plastic products or articles as may be prepared broadly by the step of flowing or extruding a heat plastified synthetic resinous thermoplastic through a die orifice.

For the preparation of tubular products, the die 10 comprises a die body or housing 14 defining a generally cylindrical internal space or die cavity 16. The die housing may comprise several distinct parts or sections 18, 20, 22. The intermediate section 20 of the housing is joined to the uppermost die section 22 (in the orientation of the drawing) by means of a threaded flange 24, a threaded collar piece 26, and a flange 28. The lowermost die section, or the forward end 18 of the die housing is similarly joined to the opposite end of intermediate section 20 by a threaded end 30, 32 in these pieces, respectively. A hollow annular space 34 is defined immediately below threaded ends 30, 32. Space 34 is designed to minimize the transfer of heat from the forward end 18 of the die housing to the intermediate section 20, for reasons as will become more apparent hereinafter.

A core member or mandrel 36 is positioned concentrically in the internal space of the die housing and defines therewith an annular primary or main resin flow channel 38. The primary flow channel terminates in an annular extrusion orifice 40 from which the molten or heat plastified material is expelled from the die to prepare tubular product 12.

The forward end of the core is reduced in size by means of an adapter element 42 which is continuous with and forms the inner lip 44 of the extrusion orifice. The adapter element with the aid of an internal annular mold piece 46, held in place by spiders or the like, defines a first non-primary resin flow channel 48. The first non-primary flow channel is disposed on the inward side of the primary flow channel, and communicates therewith through first and second spaced, annular passageways 50, 52, respectively. The passageway 50 diverts material from the primary flow stream into the first non-primary resin flow channel. The second passageway or annular orifice 52 recombines the diverted material with the primary flow stream preferably just prior to passing the combined streams over the inner die lip 44. A heater element 54 is inset in the adapter element of the core, and is designed to provide a selective heat source to the area of the first non-primary flow channel and thus ultimately to the resin which is diverted therethrough.

The forward end section of the die housing defines an internal recessed surface 56. Spaced from and positioned opposite recessed surface 56 is a second annular internal die piece 58, which may be also held in place by spiders. The second internal die piece 58, together with recessed surface 56, defines a second, non-primary resin flow channel 60. The second non-primary flow channel is disposed on the outward side of the primary flow channel and communicates therewith through annular passageways 62, 64 which are spaced in the flow direction. The passageway 62 is designed to divert a portion of the resin from the primary resin flow channel. The diverted material is thereafter recombined via the passageway 64 with the primary stream prior to passage of the combined streams over the outer die lip 66. Plural heater elements or means 68, 70 are inset in the forward section of the die to selectively heat the area of the second non-primary flow channel and ultimately the material diverted therethrough.

The die 10 may receive the resin material input from a conventional source or source means of a heat plastified extrudable material as shown partial at 72. The material is forced under pressure to flow through the primary flow channel before it is ultimately expelled from the extrusion orifice in the form of product 12. Preferably only small amounts of material are diverted from the primary stream to the first and second non-primary resin flow channels. The diverted material is subjected to additional, preferably relatively intense heat to raise its temperature substantially above that of the primary material. The time of dwell or residence of the diverted material within the non-primary flow channels non-continuous extrusion technique as described above. Condition A of the table below specifies the step of selectively heating the non-primary flow channels, whereas this selective heating step is not practiced in operating under Condition B. Under Condition A an extruded product is obtained with a good surface finish, whereas under generally comparable extrusion conditions (Condition B) the surface finish of the product is unsatisfactory.

TABLE

| | Temperature (°F.) | | | | | | |
|---|---|---|---|---|---|---|---|
| | Extruder Barrel | | | Die | | Plastic Temp. | Melt |
| | Rear | Middle | Front | Head | Die Pockets | °F. | Fracture |
| Condition A | 325 | 350 | 325 | 300 | 650 | 430 | No |
| Condition B | 350 | 400 | 420 | 420 | 420 | 445 | Yes | together with the intensity of the selective heating step is correlated to avoid serious or objectionable thermal degradation of the polymer. The necessary melt strength of the extruded polymer is achieved via the strength of the relatively cooler core of material which avoids the non-primary flow channels; and passes directly to the extrusion orifice.

The diverted material is recombined with the primary or core stream by "layering" or coating the hot material generally uniformly onto the opposite surfaces of the core stream through annular passageways or internal orifices 52, 64, respectively. The hot boundary layers shown at 74, 76, respectively, are thus interposed between the core stream 78 and the inner and outer die lips 44, 66, respectively prior to the combined streams being expelled from the die.

The process and die of this invention is especially suited to the downward extrusion of tubular parisons, an intermediate product, which is subsequently pinched off at a position exterior to the die, and blown to prepare shaped hollow articles such as bottles or drums. Such a process requires good melt strength to support the extruded parison, and smooth surface finishes for optimum quality products. The process is typically carried out intermittently so that it is frequently desirable to inventory material temporarily in the non-primary flow channels. The inventoried material will thus be adequate to provide continuous hot surface layers as each parison is rapidly formed. This may be expediently controlled in the process and apparatus described by the size of the non-primary flow channels which are made large enough to provide "pockets" of hot material adequate for forming the hot layers 74, 76, in an intermittent extrusion process. The intermittent or continuous process can thus provide enough heat in the surface layers to avoid loss of surface smoothness, but excessive heat beyond that is preferably not applied to leave a safe margin to avoid thermal damage to the resin providing the hot layers.

The die and process hereof may be utilized to prepare extruded products utilizing a broad array of known synthetic resinous thermoplastic materials which are extrudable. In addition such may be utilized to successfully extrude polymers which because of excessive proneness to melt fracture or loss of surface smoothness were heretofore considered to possess unsatisfactory or poor extrusion characteristics.

As a more specific example, a copolymer of ethylene and butene having a density of 0.9490 and a melt index $I_2$ of 0.38 and $I_{10}$ of 4.12, may be advantageously extruded to prepare parisons for blow molding, using a As yet another teaching example, smooth surface polyethylene pipe may be continuously extruded utilizing a resin having a melt index $I_2$ of 0.05 and a density of 0.950. This material, having a relatively narrow band molecular weight distribution, showed extreme tendency toward melt fracture under conventional extrusion processing. The successful extrusion processing of the same material according to the invention employed an extrusion rate of between about 90 to 110 pounds per hour, a resin temperature into the die of about 400° F., and a temperature of about 550° F. for the non-primary flow channels which raised the temperature of the boundary streams to about 460° to 475° F. The non-primary flow channels in this process are desirably longer and more narrow than a die designed for intermittent extrusion.

In both the examples given above it is preferable to maintain the core at about 75 to 85% of the extruded product with the heated surface layers together comprising about 15% to 25% of the product. More generally the core may comprise between about 50 to about 98% of the extruded product, with the hot surface layers comprising the remainder. Generally it is desirable however, to retain a fairly thick core to maximize the melt strength of the product leaving the die. Also in both examples above the dividing of the homogenized material and the recombining of the material did not produce a layered end product, that is, the product upon inspection did not reveal a layered structure.

It is understood that the above teachings represent the preferred embodiment of the invention and that understandably various modifications to the preferred embodiment would be possible while remaining within the fair scope of the inventive teachings.

What is claimed is:

1. In a process for preparing extruded articles with substantially reduced melt fracture and improved surface smoothness by flowing a heat plastified stream of an extrudable synthetic resinous thermoplastic material through an extrusion orifice, the steps performed prior thereto of:
   (a) physically separating the stream into a central core stream and first and second boundary streams on each side of the core stream;
   (b) while maintaining physical separation of the core and boundary streams, selectively heating the boundary streams to a temperature substantially hotter than the material in the core stream;
   (c) thereafter, recombining the streams prior to expelling the material out the extrusion orifice, said boundary streams being applied as relatively thin hot layers generally uniformly onto the opposite surfaces, respectively, of the core stream.

2. The method of claim 1 wherein said streams are recombined generally near the extrusion orifice.

3. An extrusion process for reducing melt fracture and improving surface smoothness characterized by the steps of:
   (a) providing a source of a generally homogeneous, extrudable synthetic resinous thermoplastic material;
   (b) routing a major portion of the source material along a first primary flow path ultimately terminating in an extrusion orifice;
   (c) routing a minor portion of the source material to an area removed from the primary flow path;
   (d) generally selectively heating the material while in residence in said area to a temperature substantially hotter than the material in the primary flow path;
   (e) thereafter layering the selectively heated material onto at least one surface of the resin following the primary flow path prior to expelling the material through an extrusion orifice.

4. The process of claim 3 wherein step (c) comprises routing a minor portion of the material to first and second areas, respectively, removed from the primary flow path, step (d) comprises generally selectively heating the material in each said area, and step (e) comprises layering the selected material from said areas generally uniformly onto opposite surfaces, respectively, of the resin following along the primary flow path prior to expelling the material through an extrusion orifice.

5. The process of claim 4 wherein step (c) is practiced at a location generally near the extrusion orifice.

6. An extrusion process for reducing melt fracture and improving surface smoothness comprising the steps of:
   (a) providing a source of a heat plastified extrudable synthetic resinous thermoplastic material;
   (b) advancing the material along a first flow path toward an extrusion orifice;
   (c) diverting a portion material from the first flow path to a second flow path and generally selectively heating the diverted material while in residence in the second flow path to a temperature substantially hotter than the material in the first flow path; thereafter;
   (d) applying the selectively heated material as a relatively thin layer to one surface of the resin flowing in the first flow path approximately just prior to passing the material through an extrusion orifice.

7. The process of claim 6 wherein steps (b) through (d) are performed within an extrusion die.

8. The process of claim 7 wherein material is diverted to plural secondary flow paths, thereafter selectively heated, and applied as a thin coating to substantially the entire surface area of the resin in the first flow path prior to expelling the material through the extrusion orifice.

* * * * *